Don S. Wolverton, Inventor

D. S. WOLVERTON.
HARROW.
APPLICATION FILED OCT. 19, 1920.
1,430,483.
Patented Sept. 26, 1922.
2 SHEETS—SHEET 2.
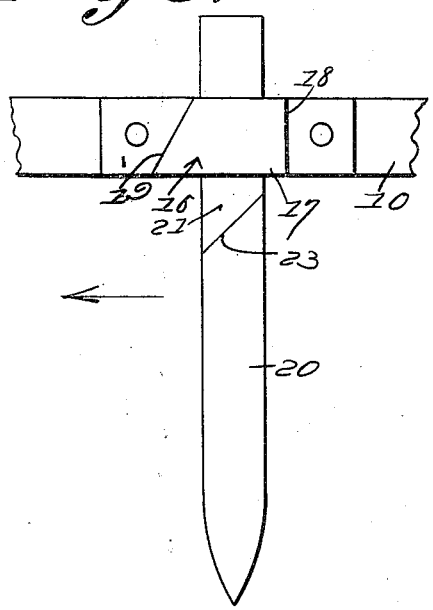
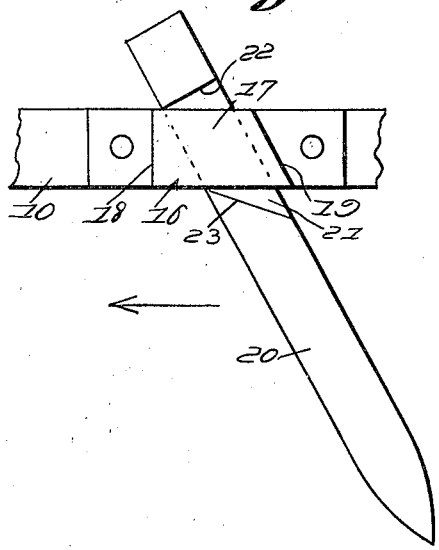
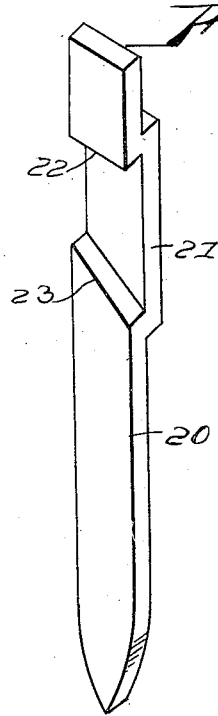
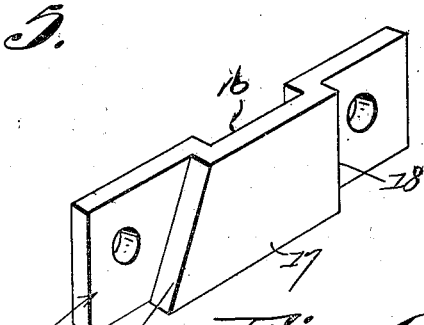
Inventor
Don S. Wolverton,
By
Attorney Patented Sept. 26, 1922.

1,430,483

UNITED STATES PATENT OFFICE.

DON S. WOLVERTON, OF DOLAND, SOUTH DAKOTA.

HARROW.

Application filed October 19, 1920. Serial No. 418,046.

*To all whom it may concern:*

Be it known that I, DON S. WOLVERTON, a citizen of the United States of America, residing at Doland, in the county of Spink and State of South Dakota, have invented new and useful Improvements in Harrows, of which the following is a specification.

The object of the invention is to provide a comparatively simple and efficient construction of harrow for general cultivating and farm use which is more adaptable and responsive in its action to the irregularities in the surface of the soil than the types of machines for this purpose now in common use in that it is designed especially to provide for the independent following of the undulations in the surface and treat the soil more or less uniformly on ridges and in hollows while being free to yield upon encountering a resistant obstacle such as a rock or stump without liability of injuring the harrow teeth; and furthermore to provide in a device of this type means whereby the soil engaging teeth or bits are readily adaptable to the conditions under which the treatment of the soil can be conducted to the best advantage, particularly to growing crops, in that it is convertible without modification of construction to adapt it for either deep or shallow harrowing action; and with these objects in view the invention consists in the construction and combination of parts of which a preferred embodiment is shown in the drawing, wherein:—

Figures 3 and 4 are detail side views of a portion of the harrow bar showing the arrangement thereof respectively for deep and shallow harrowing.

Figure 5 is a detail view in perspective of one of the harrow teeth.

Figure 6 is a similar view of one of the harrow tooth keepers or sockets.

Figure 1:
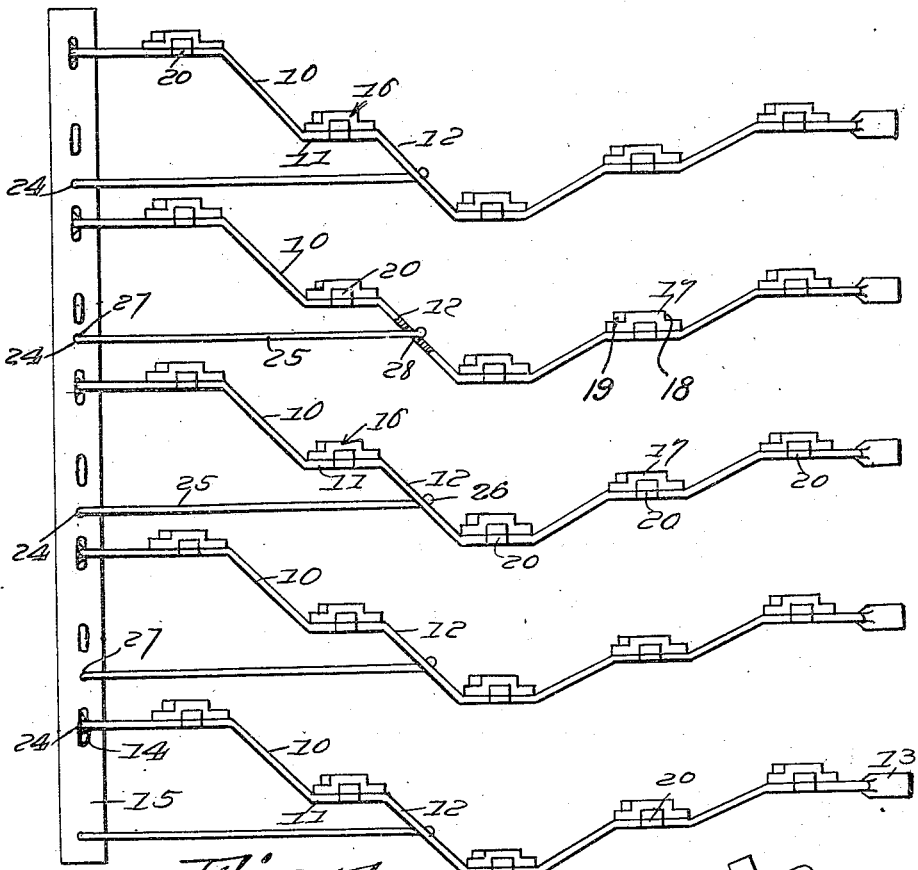
Figure 1 is a plan view of a harrow embodying the invention.
Figure 2:
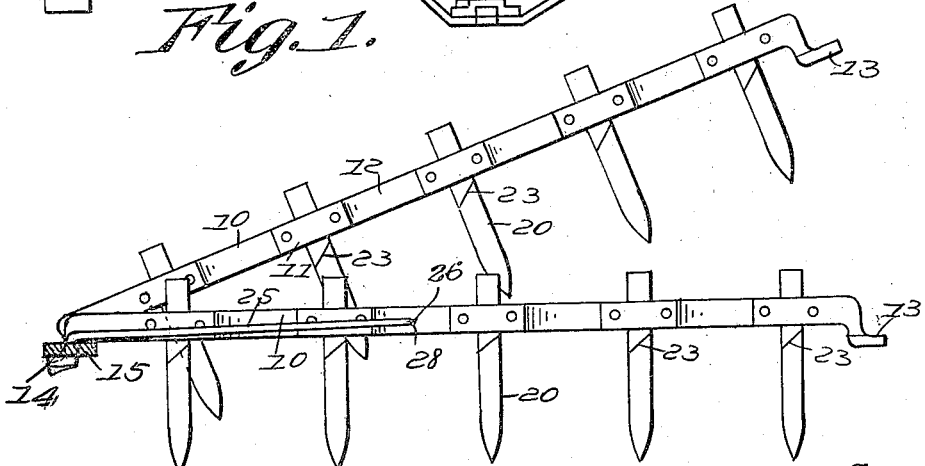
Figure 2 is a side view of the same showing the near harrow bar in its normal or operative position and one of the remote harrow bars elevated as when encountering an obstruction such as a stump or stone, the elements of the device being arranged for deep harrowing.

In the illustrated embodiment of the invention the harrow bars 10 are of stepped or consecutively offset form in plan providing for example longitudinal tooth carrying portions 11 and intermediate connecting diagonally disposed offsets 12, the general contour of each bar in plan being arcuate with terminal means shown at 13 and 14 for alternate or selective attachment to a transverse draw bar 15 to which the draft appliances of any preferred construction and not specifically illustrated, may be attached. The longitudinal tooth carrying portions of the harrow bars preferably carry tooth sockets or keepers 16 each having a side wall 17 parallel with the adjacent portion of the tooth bar, and end walls 18 and 19 which are respectively vertical and inclined or diagonally disposed with reference to the length of the tooth bar for the reception of a tooth 20 having an offset shank 21 designed to fit in the socket or keeper and having upper and lower shoulders 22 and 23 for contact respectively with the upper and lower edges of the tooth bar. When the tooth bar is being drawn in the direction indicated by the arrow in Figure 3 in which the vertical wall 18 of the socket or keeper is rearmost, the resistance offered to the lower end of the tooth holds the tooth in contact with the said rear or vertical wall of the socket or keeper and the tooth is thereby maintained in the vertical or deep harrowing position. On the other hand when the tooth bar is moved in the direction indicated by the arrow in Figure 4 in which the inclined or obliquely disposed wall 19 of the socket or keeper is rearmost, the resistance offered to the lower extremity of the tooth deflects or inclines the tooth rearwardly toward its lower end and brings the rear edge of the tooth into contact with the wall 19 so that the harrow is adapted for shallow work as when cultivating young corn or potatoes. In the last named position of the harrow tooth the oblique shoulder 23 thereof is in contact with the lower edge of the tooth bar as shown in Figure 4.

The means of connection of the terminals of the tooth bars with the draw bar consist in the construction illustrated of reversely curved hooks adapted for engagement with openings 24 in the draw bar and terminally extending forward beneath said bar to the end that the engagement of the selected front end of the tooth bar with the draw bar may only be effected by raising the tooth bar to a position approximately perpendicular to the plane of the draw bar. Obviously a reversal of the position of the tooth bar or an interchange of the terminals engaged with the draw bar to convert the harrow from a deep operating to a shallow operating condition may be accomplished without the use of tools.

As a means of maintaining the tooth bars in their proper trailing relation to the draw bar tension brace rods 25 may be employed extending rearwardly from the draw bar to intermediate portions of the respective tooth bars as indicated clearly in Figure 1, the means of terminal connection of the brace rods to the draw bar and tooth bar consisting of the reversely curved hooks 26 for engagement with suitable perforations or openings 27 and 28 respectively in the draw bar and tooth bar.

Having described the invention, what is claimed as new and useful is:

1. A harrow having a tooth bar provided with a tooth socket having respectively vertical and obliquely disposed end walls, and a tooth having an offset shank fitted in said socket and provided with upper and lower shoulders for engagement respectively with the corresponding edges of the bar.

2. A harrow having a tooth bar provided with a tooth socket having respectively vertical and obliquely disposed end walls, and a tooth having an offset shank fitted in said socket and provided with upper and lower shoulders for engagement respectively with the corresponding edges of the bar one of said shoulders being obliquely disposed with reference to the length of the tooth.

3. A harrow having a tooth bar provided with a tooth socket having respectively vertical and obliquely disposed end walls, and a tooth having an offset shank fitted in said socket and provided with upper and lower shoulders for engagement respectively with the corresponding edges of the bar the lower shoulder being obliquely disposed with reference to the length of the tooth.

In testimony whereof he affixes his signature.

DON S. WOLVERTON.